(12) United States Patent
Cook

(10) Patent No.: US 7,044,111 B2
(45) Date of Patent: May 16, 2006

(54) PURGE VALVE HAVING PERMANENT MAGNET ARMATURE

(75) Inventor: John E. Cook, Chatham (CA)

(73) Assignee: Siemens VDO Automotive Inc., Chatham (CA)

(*) Notice: Subject to any disclaimer, the term of this patent is extended or adjusted under 35 U.S.C. 154(b) by 0 days.

(21) Appl. No.: 10/892,313

(22) Filed: Jul. 16, 2004

(65) Prior Publication Data
US 2005/0029480 A1 Feb. 10, 2005

Related U.S. Application Data

(60) Provisional application No. 60/493,217, filed on Aug. 7, 2003.

(51) Int. Cl.
*F02M 37/04* (2006.01)

(52) U.S. Cl. .................. 123/520; 123/458; 251/129.16

(58) Field of Classification Search ................ 123/520, 123/519, 518, 516, 458; 251/129.22, 129.21, 251/129.15, 129.16
See application file for complete search history.

(56) References Cited

U.S. PATENT DOCUMENTS

| | | | |
|---|---|---|---|
| 4,564,046 A * | 1/1986 | Lungu | ................... 137/625.65 |
| 5,188,336 A * | 2/1993 | Graner et al. | ........... 251/129.16 |
| 5,299,776 A | 4/1994 | Brinn, Jr. et al. | |
| 5,413,082 A * | 5/1995 | Cook et al. | .................. 123/520 |
| 5,535,725 A * | 7/1996 | Baker et al. | ................. 123/520 |
| 5,649,687 A * | 7/1997 | Rosas et al. | ........... 251/129.15 |
| 5,791,318 A * | 8/1998 | Schulz et al. | ................ 123/520 |
| 5,947,092 A * | 9/1999 | Hussey et al. | ......... 123/568.26 |
| 6,050,245 A * | 4/2000 | Cook et al. | .................. 123/520 |
| 6,199,587 B1 | 3/2001 | Shlomi et al. | |
| 6,289,858 B1 | 9/2001 | Altdorf et al. | |
| 6,439,214 B1 | 8/2002 | Yew | |
| 6,546,945 B1 * | 4/2003 | Ishigaki et al. | ........... 137/15.18 |

\* cited by examiner

*Primary Examiner*—Carl S. Miller

(57) ABSTRACT

A purge valve for an evaporative emission control system. The purge valve includes an actuator, a valve body, and a valve closure member disposed in the valve body. The actuator is disposed along a longitudinal axis, and includes an electromagnetic coil having a hollow core extending along the longitudinal axis, a stator disposed in the hollow core, and a permanent magnet armature disposed proximate the stator. The valve body is disposed proximate the actuator, and defines a flow passage extending along the longitudinal axis. When the coil is unenergized, the permanent magnet armature is magnetically attracted to the stator, and the valve closure member is spaced from the armature by a lost motion distance.

15 Claims, 4 Drawing Sheets

PURGE VALVE HAVING PERMANENT MAGNET ARMATURE

CROSS REFERENCE TO CO-PENDING APPLICATIONS

This application claims the benefit of the earlier filing date of U.S. Provisional Application No. 60/493,217 filed Aug. 7, 2003, the entirety of which is incorporated by reference herein.

FIELD OF THE INVENTION

This invention relates generally to on-board emission control systems for internal combustion engine powered motor vehicles, e.g., evaporative emission control systems, and more particularly to a canister purge solenoid valve in an evaporative emission control system.

BACKGROUND OF THE INVENTION

A known on-board evaporative emission control system includes a vapor collection canister that collects fuel vapor emitted from a tank containing a volatile liquid fuel for the engine. As the vapor collection canister collects fuel vapor, the canister progressively becomes more saturated with the fuel vapor. During engine operation, vacuum from the engine intake manifold induces atmospheric air flow through the canister to desorb the collected fuel vapor, and draws the fuel vapor into the engine intake manifold for consumption in the combustion process. A canister purge solenoid valve is under the control of a purge control signal generated by a microprocessor-based engine management system, and periodically purges the collected vapor to the engine intake manifold.

SUMMARY OF THE INVENTION

In an embodiment, the invention provides a purge valve for an evaporative emission control system. The valve includes a housing, an actuator, a valve body, and a valve closure member. The housing is disposed along a longitudinal axis, and includes a first wall defining a first chamber. The actuator is disposed in the first chamber, and includes a bobbin having a hollow core extending along the longitudinal axis, an electromagnetic coil wound on the bobbin, a stator disposed in the hollow core, and an armature disposed along the longitudinal axis proximate the stator. The armature is a permanent magnet. The valve body is disposed proximate the housing, and defines a first flow passage extending along the longitudinal axis. The valve closure member is disposed in the valve body and includes a pin extended along the longitudinal axis. A distal end of the pin is spaced from the armature by a lost motion distance, the valve closure member forms a seal with a valve seat, and the permanent magnet armature is magnetically attracted to the stator when the coil is unenergized.

In another embodiment, the invention provides a method of actuating a closure member in a purge valve for an evaporative emission control system. The purge valve includes an actuator having an electromagnetic coil, a stator, and a permanent magnet armature. The purge valve includes a valve body that defines a flow passage and a valve closure member disposed in the valve body. The method includes energizing the electromagnetic coil, inducing a polarity in the stator that is the same as a polarity of a proximate portion of the armature, and repulsing the armature from the stator by a lost motion distance before the armature contacts the valve closure member.

In yet another embodiment, the invention provides a purge valve for an evaporative emission control system. The valve includes a housing, an actuator, a valve body, and a valve closure member. The housing is disposed along a longitudinal axis, and includes a wall defining a chamber. The actuator is disposed in the chamber, and includes a bobbin having a hollow core extending along the longitudinal axis, an electromagnetic coil on the bobbin, a stator disposed in the hollow core, a strap completing an electromagnetic circuit with a first end and a second end of the stator, and an armature disposed along the longitudinal axis proximate the stator. The strap includes a plurality of protrusions contacting the housing wall to radially position the actuator in the housing. The armature is a permanent magnet. The valve body is proximate the housing, and defines a flow passage. The valve closure member is disposed in the valve body.

In yet another embodiment, the invention provides a purge valve for a fuel system including an intake manifold of an internal combustion engine and a fuel tank in vapor communication with a fuel vapor collection canister. The purge valve includes an aperture that defines a portion of a vapor flow path extending between first and second ports, a member being displaced between first and second configurations with respect to the aperture, and an actuator displacing the member between the first and second configurations. The first port for communicating with the fuel vapor collection canister, and the second port for communicating with the intake manifold. The member in the first configuration occludes the aperture, and vapor flow along the vapor flow path is substantially prevented. The member in the second configuration is spaced from the aperture, and vapor flow along the vapor flow path is permitted. The actuator includes an armature, and a stator. The armature includes a permanent magnet. The stator includes a winding surrounding at least a portion of the permanent magnet.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
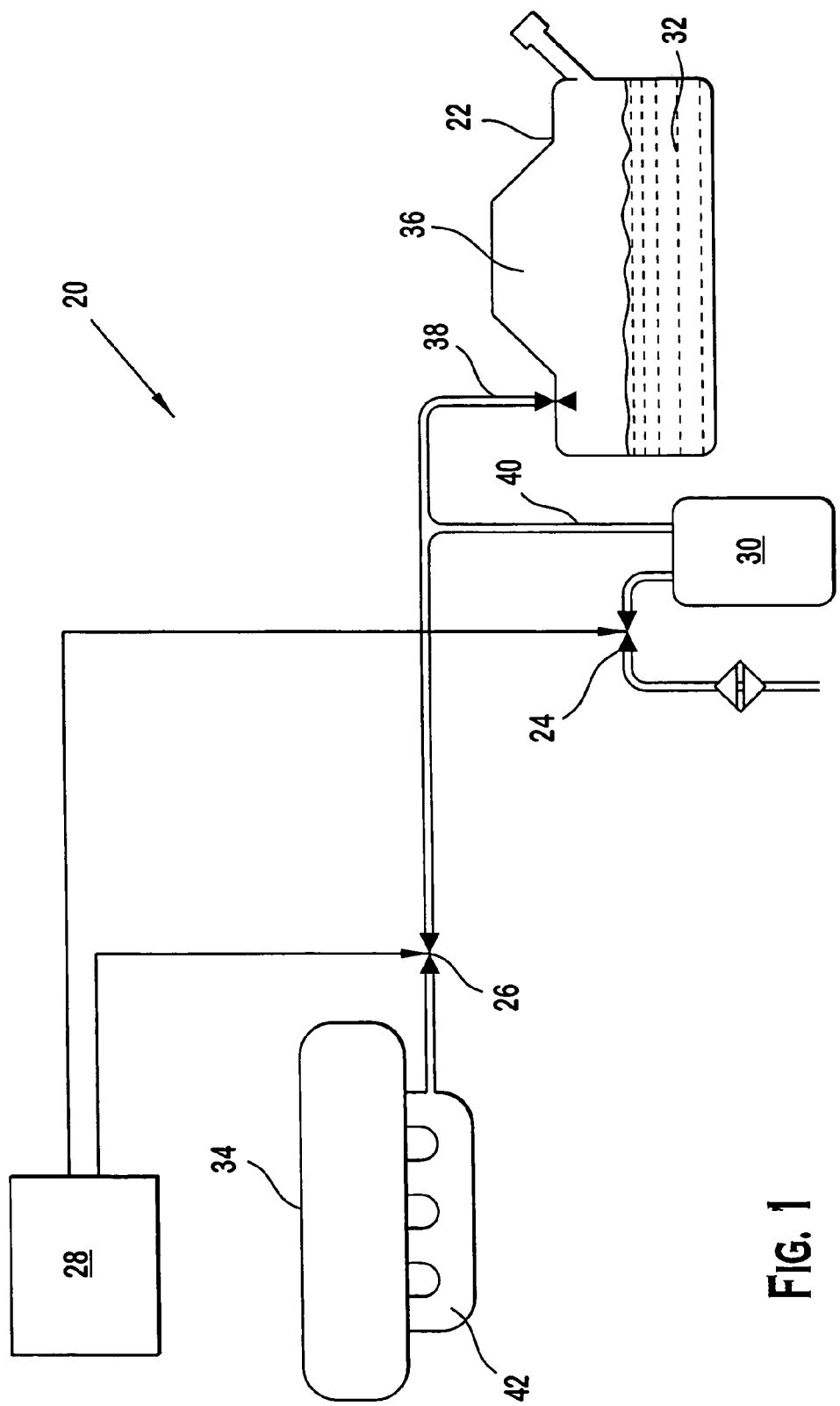
FIG. 1 is a schematic illustration of an on-board evaporative emission control system, according to an embodiment of the invention.

FIG. 1 schematically illustrates a preferred embodiment of an on-board evaporative emission control system 20. In the preferred embodiment, system 20 includes a vapor collection canister 30, a fuel tank 22, an integrated pressure management apparatus 24, a canister purge solenoid valve 26, and a microprocessor-based engine management system 28. Fuel tank 22 contains a volatile liquid fuel 32 for supplying an internal combustion engine 34. Fuel vapor is emitted from the volatile liquid fuel 32 to a headspace 36 in the fuel tank 22. Conduits 38 and 40 provide a vapor connection between head space 36, vapor collection canister 30, and an intake manifold 42 of the internal combustion engine 34. Canister purge solenoid valve 26 is disposed in conduit 38 between intake manifold 42 and vapor collection canister 30. The integrated pressure management apparatus 24 is preferably integrally mounted on the vapor collection canister 30, and manages the internal pressure of the vapor collection canister 30 and the fuel tank 22. Reference is made to U.S. Pat. No. 6,668,876 for further description of an integrated pressure management apparatus.

Vapor collection canister 30 collects fuel vapor emitted from the headspace 36. The amount of fuel vapor formed in headspace 36 is a function of vehicle dynamics, slosh, temperature, the type and grade of the volatile liquid fuel 32 in tank 22, and the pressure in tank 22. During operation of engine 34, vacuum from the engine intake manifold 42 acts on the canister purge solenoid valve 26. The canister purge solenoid valve 26 is under the control of a purge control signal generated by the microprocessor-based engine management system 28, and periodically purges the collected vapor to the engine intake manifold. With canister purge solenoid valve 26 in an open configuration, vacuum induces atmospheric air flow through the vapor collection canister 30 to desorb the collected fuel vapor from the canister 30, and draw the fuel vapor into the engine intake manifold 42 for consumption in the combustion process.

Figure 2:
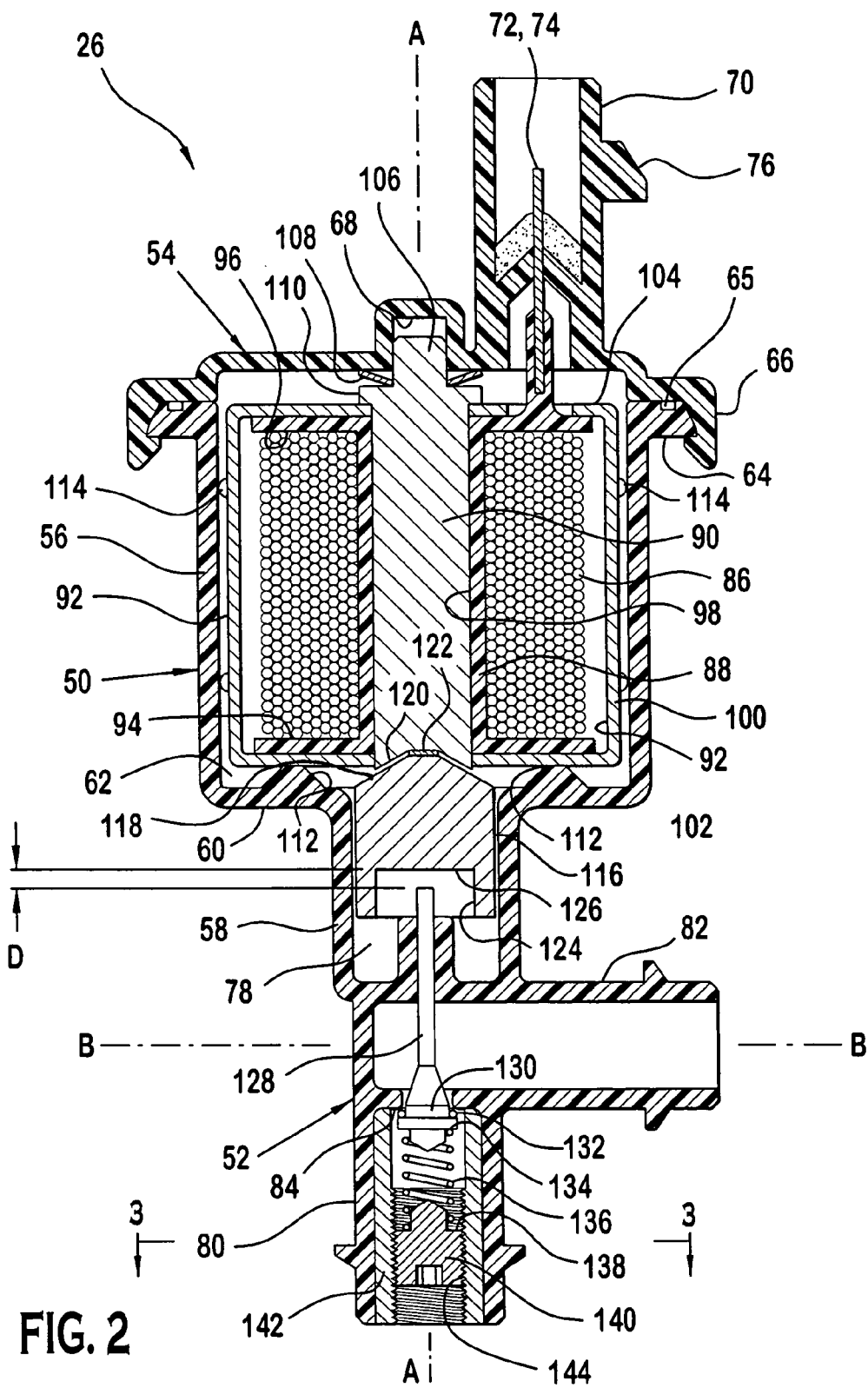
FIG. 2 is a cross-sectional view of a canister purge solenoid valve, according to an embodiment of the invention.

In a preferred embodiment, canister purge solenoid valve 26 is a proportional solenoid valve. FIG. 2 illustrates a preferred embodiment of the proportional solenoid valve 26. In the embodiment, solenoid valve 26 includes three structures that contain the internal parts of the solenoid valve an actuator housing 50, a valve body 52 and a cap 54. The housing 50, valve body 52 and cap 54 may be formed by plastic-injection molding. As shown, the housing 50 and valve body 52 are formed as a single monolithic member. However, it is to be understood that housing 50 and valve body 52 can be formed in any manner suitable for containing the actuator and valve components of the solenoid valve 26. For example, housing 50 may be formed as a separate member from valve body 52 and joined to valve body 52 at a connecting interface.

Housing 50 includes a first wall 56, a second wall 58, and an intermediate wall 60 connecting the first wall 56 and the second wall 58. The first wall 56 is generally in the form of a cylinder disposed along a longitudinal axis A—A, and in combination with the cap 54 and intermediate wall 60 defines a first chamber 62. An annular lip 64 is formed around the perimeter of one end of the first wall 56 for completing a snap fit with a catch feature 66 formed around the perimeter of cap 54. An o-ring 65 facilitates a proper seal between the respective perimeters. At a central portion of the cap 54 proximate the longitudinal axis A—A there is formed a stator positioning recess 68. A connector body formation 70 is disposed radially outward from the recess 68 and is integrally formed with the cap 54. The connector body formation 70 positions first and second terminals 72, 74 for an electrical connection with respective terminals in a connector body formation of the engine management system 28 (not shown). A protrusion 76 is received by a respective recess in the connector body formation of the engine management system 28 to ensure proper alignment of the terminals. The second wall 58 is generally in the form of a cylinder disposed along the longitudinal axis A—A, and forms a second chamber 78 axially adjacent to the first chamber 62 and having a diameter that is less than a diameter of the first chamber 62. The first and second chambers 62, 78 contain the actuator parts of the canister purge solenoid valve 26, as described more fully below.

The valve body 52 is disposed axially adjacent to the second chamber 78 along the longitudinal axis A—A. Valve body 52 defines a flow passage for the fuel vapor, and includes an inlet portion 80 disposed along the longitudinal axis A—A, and an outlet portion 82 disposed along an axis B—B. As shown, axis B—B is generally transverse to the longitudinal axis A—A, however axis B—B may be oriented with respect to axis A—A as needed for fit-up within the emission control system 20. An orifice disposed at an interface of the inlet portion 80 and the outlet portion 82 forms a valve element sealing surface 84. The valve body 52 contains the valve parts of the canister purge solenoid valve 26, as described more fully below.

An electromagnetic actuator assembly is disposed in the first chamber 62 and includes an electromagnetic coil 86, a bobbin 88, a stator member 90 and straps 92. The coil 86 is wound around the bobbin 88 between first and second flanges 94, 96. Ends of the coil 86 truncate at terminals 72, 74. The bobbin 88 includes a hollow core 98 extending between the first and second flanges 94, 96. The stator member 90 is formed of a magnetic material and is disposed in the hollow core 98 and preferably extends between the first and second flanges 94, 96. Straps 92 are formed of a magnetic material and include a first portion 102, a second portion 104, and an intermediate portion 100 connecting the first and second portions 102, 104. First and second portions 102, 104 are generally disposed in the direction of the transverse axis B—B and are in abutting contact with first and second ends of the stator member 90. The coil is energized by the purge control signal generated by the microprocessor-based engine management system 28, thus generating magnetic flux. The magnetic flux flows along a path through the stator member 90, the first portion 102, the intermediate portion 100, and the second portion 104, thus creating a magnetic pole in the stator member 90. In one embodiment, a south pole is created in the stator member 90. A combination of features properly positions the electromagnetic actuator assembly in the first chamber 62. A protrusion 106 at one end of the stator member 90 is received in the stator positioning recess 68 formed in the cap 54. An annular spring washer 108 disposed on the protrusion 106 biases a hip portion 110 of the stator member 90 against the second portion 104 of the straps 92. The biasing force is opposed by protrusions 112, formed integrally with intermediate housing wall 60 to properly position the electromagnetic actuator assembly in the first chamber 62 in the longitudinal direction. Tabs 114 are stamped from the straps 92 and bent radially outward for a positioning contact with the first wall 56. Tabs 114 properly position the electromagnetic actuator assembly in the first chamber 62 in the radial direction.

A permanent magnet armature 116 is disposed in the second chamber 78 for axial movement therein. A cylindrical outer surface of the armature 116 is in sliding contact with an inner surface of second wall 58 such that the second wall 58 guides the armature 116 during the axial movement. A first end of the armature 116 forms a conic frustum 118 for reception in a corresponding conic frustum 120 formed in the stator member 90. An armature stop 122 formed of a resilient shock absorbing material may be disposed on the crest of conic frustum 118 or in the cradle of conic frustum 120 for absorbing dynamic shock created by the armature 116 impacting the stator member 90 in operation. Armature 116 is a permanent magnet and is therefore naturally attracted to the stator member 90 in the unenergized condition of the coil 86 because stator member 90 is formed of a magnetic material. In the embodiment where stator member 90 is a south pole when the coil 86 is energized, the conic frustum 118 is also a south pole. Because both the stator member 90 and the conic frustum are the same polarity in the energized condition of the coil, the armature 116 is repulsed from the stator member 90 in the energized condition. In another embodiment, the stator member 90 is a north pole in the energized condition of the coil and the conic frustum of the armature 116 is a north pole. Again, because both the stator member 90 and the conic frustum are the same polarity in the energized condition of the coil, the armature 116 is repulsed from the stator member 90 in the energized condition. The armature 116 being a permanent magnet that is repulsed from the stator member 90 in the energized condition is naturally stable because as the armature 116 is moved away from the stator member 90, the electromagnetically induced force acting on the armature 116 reduces. Hence there is no tendency for the armature 116 to overshoot a desired position and thus the desired valve opening.

A second end of the armature 116 opposite the first end forms a recess 124. A surface 126 at a base of the recess 124 is spaced from a first end of a valve pin 128 by a lost motion distance D in the unenergized condition of the coil. In the energized condition of the coil, armature 116 is repulsed from the stator member 90 by the lost motion distance D before the surface 126 contacts the valve pin 128 to open the valve. The armature surface 126 being spaced from the valve pin 128 by the lost motion distance D provides numerous advantages. For example, vibration of the mass of armature 116 caused by operation of the internal combustion engine 34 does not propagate to the valve pin 128 in the unenergized condition of the coil. Therefore, an undesirable unseating of the valve in the unenergized condition of the coil is prevented. Accordingly, engine mountability of the canister purge solenoid valve 26 is improved, as compared to valves having a continuous connection between the armature and the valve pin. Moreover, alignment of the valve element with the valve seat is simplified because the alignment of the valve element with the valve seat is independent of the alignment of the armature 116 in the second chamber 78.

Figure 3:
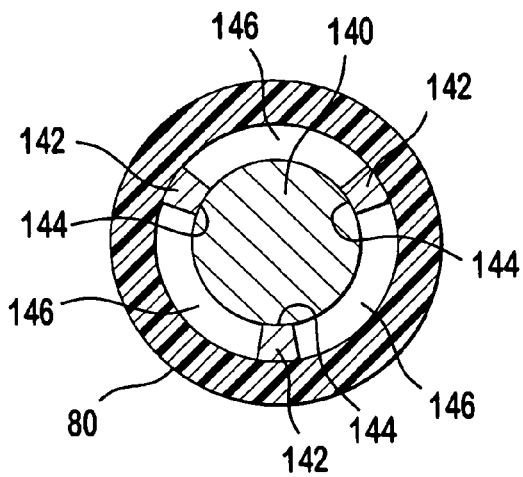
FIG. 3 is cross-sectional view at axis 3—3 of FIG. 2.

The valve parts of the canister purge solenoid valve 26 are disposed in the valve body 52. Valve element 130 is formed at a second end of the valve pin 128 and forms a seal with the orifice 84 in the unenergized condition of the coil. An o-ring 132 facilitates a proper seal. Valve element 130 includes a hip portion 134 that receives and positions a first end of a biasing spring 136. A second end of the biasing spring 136 is received and positioned by a hip portion 138 of a calibration member 140. Calibration member 140 forms a threaded engagement 144 with ribs 142 formed on the side wall of the inlet portion 80. Calibration member 140 may be axially advanced toward the orifice 84 to compress the biasing spring 136 and increase the force required to unseat the valve element 130 from the orifice 84. FIG. 3 illustrates a cross-section at axis 3—3 in FIG. 2. Referring to FIG. 3, the outer surface of the calibration member 140 and the inner surface of the inlet portion 80 define flow passages 146 disposed between the ribs 142. Flow passages 146 allow the fuel vapor to flow through the inlet portion 80 past the calibration member 140. The calibration member 140 being disposed in the flow passage provides advantages. For example, the threaded engagement portion 144 does not require a messy sealant in the threads after calibration of the valve to ensure a vapor tight seal of the flow passage, unlike calibration members that penetrate a wall of the flow passage.

Figure 4A:
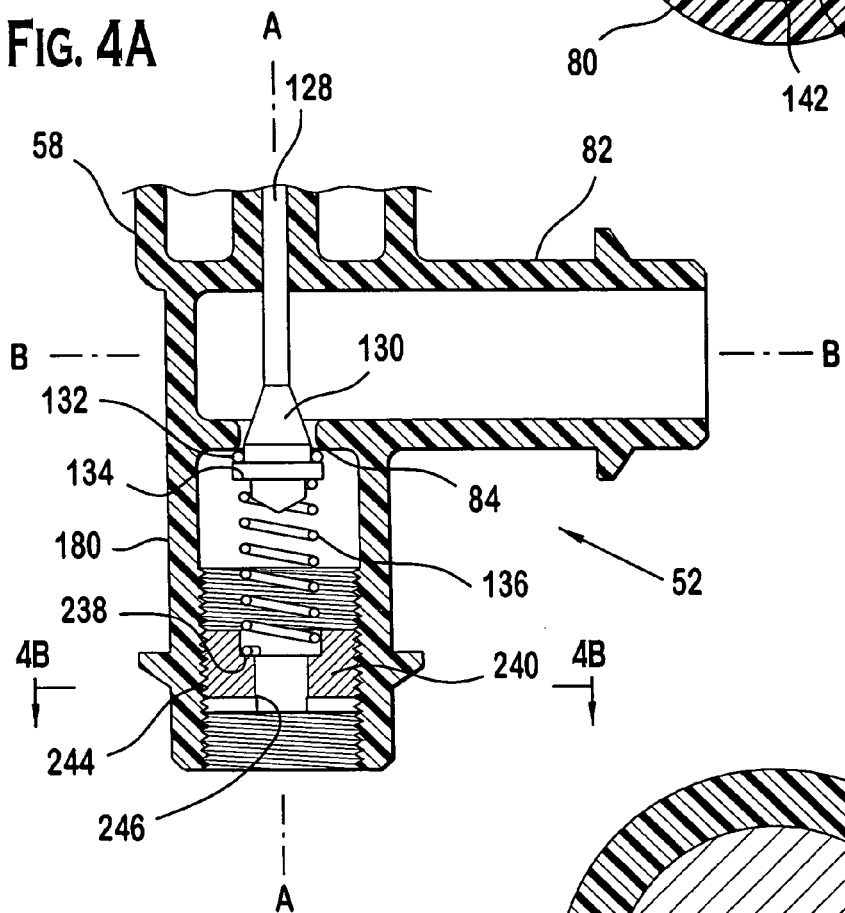
FIG. 4A is cross-sectional view of a calibration member, according to another embodiment of the invention.
Figure 4B:
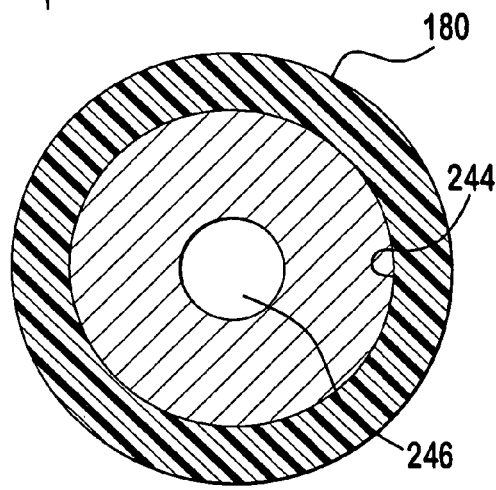
FIG. 4B is cross-sectional view at axis 4B—4B of FIG. 4A.

FIG. 4A shows another embodiment of a calibration member fitted in the inlet portion. Like parts are labeled with like references characters. A second end of the biasing spring 136 is received and positioned by a hip portion 238 of a calibration member 240. Calibration member 240 forms a threaded engagement 244 with the side wall of the inlet portion 180. Calibration member 240 may be axially advanced toward the orifice 84 to compress the biasing spring 136 and increase the force required to unseat the valve element 130 from the orifice 84. FIG. 4B illustrates a cross-section at axis 4B—4B in FIG. 4A. Referring to FIG. 4A and FIG. 4B, a flow passage 246 is formed in the central portion of calibration member 240 extending in the direction of the longitudinal axis A—A. Flow passage 246 allows the fuel vapor to flow through the inlet portion 180 past the calibration member 240. Again, the calibration member 240 being disposed in the flow passage provides advantages. For example, the threaded engagement portion 244 does not require a messy sealant in the threads after calibration of the valve to ensure a vapor tight seal of the flow passage, unlike calibration members that penetrate a wall of the flow passage.

Figure 5:
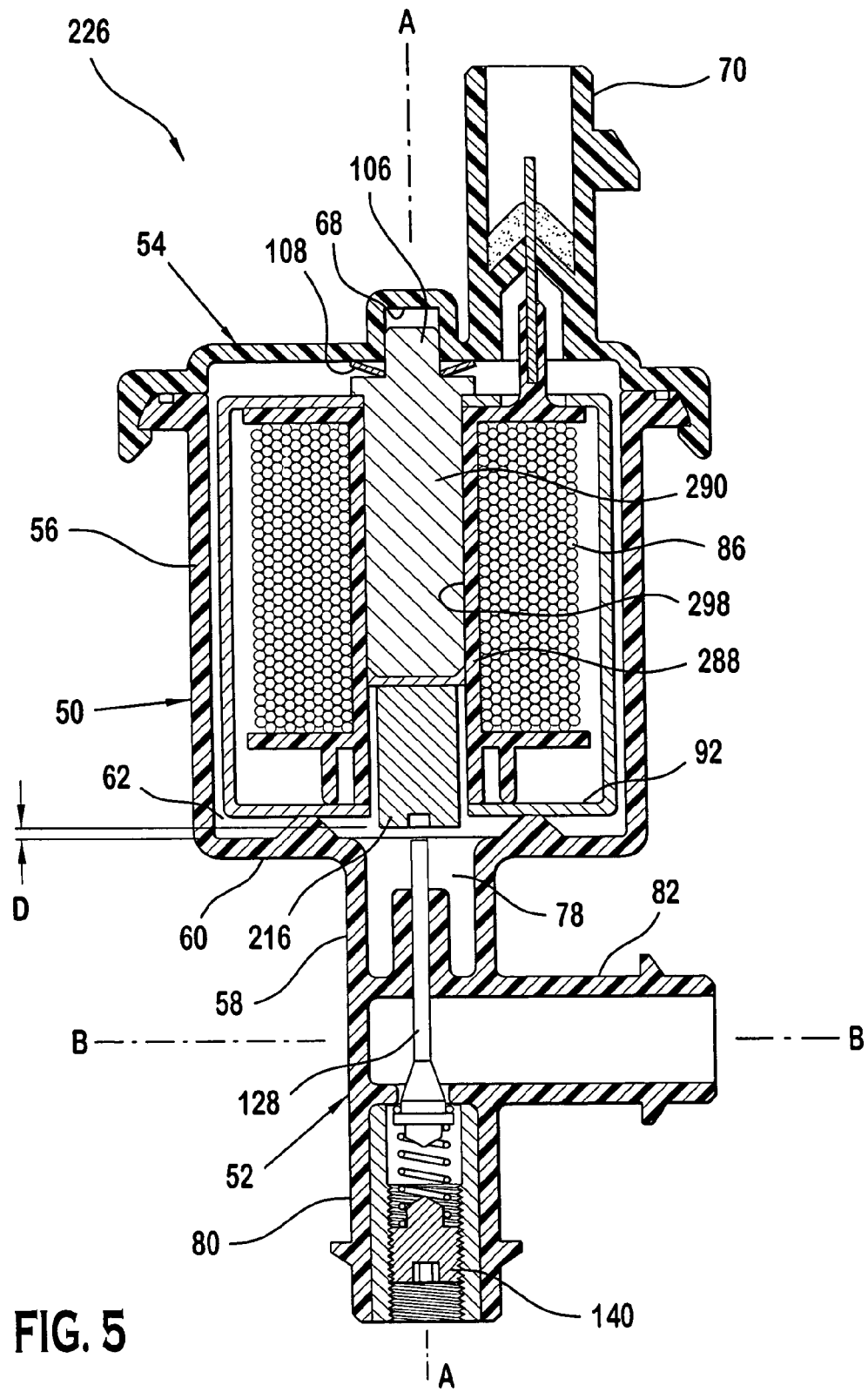
FIG. 5 is a cross-sectional view of a canister purge solenoid valve, according to another embodiment of the invention.

FIG. 5 shows another embodiment of a canister purge solenoid valve. Like parts are labeled with like references characters. In the embodiment, a bobbin 288 is disposed in the first chamber 62 and includes a hollow core 298 formed between first and second flanges. A stator 290 is disposed in the hollow core and extends from the first flange to a position intermediate the first and second flanges. A permanent magnetic armature 216 is at least partially disposed in the hollow core.

Operation of the canister purge solenoid valve 26 will now be described. In the unenergized condition of the coil 86, permanent magnet armature 116 is naturally attracted to the stator member 90 because stator member 90 is formed of a magnetic material. The surface 126 at the base of recess 124 is spaced from the valve pin 128 by a lost motion distance D. Spring 136 biases the valve element 130 against the orifice 84 to form a fluid tight seal. The coil 86 is energized by the purge control signal generated by the microprocessor-based engine management system 28, thus generating magnetic flux. The magnetic flux flows along a path through the stator member 90, and the first portion 102, the intermediate portion 100, and the second portion 104 of straps 92, thus creating a magnetic pole in the stator member 90. Because both the stator member 90 and the conic frustum 118 of the permanent magnet armature 116 are the same polarity in the energized condition of the coil, the armature 116 is repulsed from the stator member 90. The armature 116 is displaced in the longitudinal direction by the lost motion distance D before the surface 126 contacts the valve pin 128. Further displacement of the armature 116 overcomes the biasing force of the spring 136 to displace the valve element 130 axially away from the orifice 84, thus allowing flow of fuel vapor through the first flow portion 80, through flow paths 146 past the calibration member 140, through orifice 84, and through second flow portion 82.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A purge valve for an evaporative emission control system, comprising:
    a housing disposed along a longitudinal axis, the housing including a first housing wall defining a first chamber;
    an actuator disposed in the first chamber, the actuator including:
        a bobbin having a hollow core extending along the longitudinal axis;
        an electromagnetic coil wound on the bobbin;
        a stator disposed in the hollow core; and
        an armature disposed along the longitudinal axis proximate the stator, the armature being a permanent magnet;
    a valve body disposed proximate the housing, the valve body defining a first flow passage extending along the longitudinal axis;
    a valve closure member disposed in the valve body, the valve closure member including a pin extended along the longitudinal axis, a distal end of the pin is spaced from the armature by a lost motion distance, the valve closure member forms a seal with a valve seat, and the permanent magnet armature is magnetically attracted to the stator when the coil is unenergized;
    a second housing wall defining a second chamber, the armature being disposed in the second chamber;
    a cap, the cap including:
        a snap feature forming a connection with a first end of the first housing wall;
        a recess proximate the longitudinal axis receiving a first protrusion formed at a first end of the stator; and
        a connector body formed integrally with the cap, the connector body cincturing a terminal in electrical connectivity with the coil; and
    a strap completing an electromagnetic circuit with the first end and a second end of the stator;
    an intermediate housing wall connecting a second end of the first housing wall with the second housing wall, the intermediate wall being disposed in a generally radial direction, the intermediate wall including a second protrusion contacting the strap proximate the second end of the stator;
    an annular spring washer proximate the first protrusion of the stator and biasing the actuator against the second protrusion of the intermediate housing wall to axially position the actuator in the housing; and
    a third protrusion formed on the strap, the third protrusion contacting the first housing wall to radially position the actuator in the housing.

2. The purge valve according to claim 1, the armature including a first end and a second end, the armature forms a protruding conic frustum at the first end, the stator forms a recessed conic frustum at the second end of the stator, and the protruding conic frustum is disposed in the recessed conic frustum in the first configuration.

3. The purge valve according to claim 2, further comprising an armature stop member disposed on one of the protruding conic frustum and the recessed conic frustum.

4. The purge valve according to claim 1, wherein the stator comprises a south pole when the coil is energized.

5. The purge valve according to claim 1, wherein the stator comprises a north pole when the coil is energized.

6. The purge valve according to claim 1, wherein the third protrusion is stamped from the strap and bent radially outward from the strap.

7. A purge valve for an evaporative emission control system, comprising:
    a housing disposed along a longitudinal axis, the housing including a first housing wall defining a first chamber;
    an actuator disposed in the first chamber, the actuator including:
        a bobbin having a hollow core extending along the longitudinal axis;
        an electromagnetic coil wound on the bobbin;
        a stator disposed in the hollow core; and
        an armature disposed along the longitudinal axis proximate the stator, the armature being a permanent magnet;
    a valve body disposed proximate the housing, the valve body defining a first flow passage extending along the longitudinal axis;
    a valve closure member disposed in the valve body, the valve closure member including a pin extended along the longitudinal axis, a distal end of the pin is spaced from the armature by a lost motion distance, the valve closure member forms a seal with a valve seat, and the permanent magnet armature is magnetically attracted to the stator when the coil is unenergized; and
    a biasing member disposed in the first flow passage, the biasing member biasing the valve closure member against the valve seat when the coil is unenergized.

8. The purge valve according to claim 7, wherein the valve body comprises a second flow passage, the second flow passage being oriented in a generally radial direction, the valve seat being formed at an interface of the first flow passage and the second flow passage.

9. A purge valve for an evaporative emission control system, comprising:
    a housing disposed along a longitudinal axis, the housing including a wall defining a chamber;
    an actuator disposed in the chamber, the actuator including:
        a bobbin having a hollow core extending along the longitudinal axis;
        an electromagnetic coil on the bobbin;
        a stator disposed in the hollow core;
        a strap completing an electromagnetic circuit with a first end and a second end of the stator; the strap having a plurality of protrusions contacting the housing wall to radially position the actuator in the housing; and
        an armature disposed along the longitudinal axis proximate the stator, the armature being a permanent magnet;
    a valve body proximate the housing, the valve body defining a flow passage; and
    a valve closure member disposed in the valve body.

10. The purge valve according to claim 9, further comprising a cap, the cap including:
    a snap feature forming a connection with an end of the housing wall;

a recess proximate the longitudinal axis receiving a protrusion formed on the stator; and a connector body formed integrally with the cap, the connector body cincturing a terminal in electrical connectivity with the coil.

11. The purge valve according to claim 10, the valve closure member including a pin extended along the longitudinal axis, a distal end of the pin is spaced from the armature by a lost motion distance, the valve closure member forms a seal with a valve seat, and the permanent magnet armature is magnetically attracted to the stator when the coil is unenergized.

12. The purge valve according to claim 7, the armature including a first end and a second end, the armature forms a protruding conic frustum at the first end, the stator forms a recessed conic frustum at the second end of the stator, and the protruding conic frustum is disposed in the recessed conic frustum in the first configuration.

13. The purge valve according to claim 12, further comprising an armature stop member disposed on one of the protruding conic frustum and the recessed conic frustum.

14. The purge valve according to claim 7, wherein the stator comprises a south pole when the coil is energized.

15. The purge valve according to claim 7, wherein the stator comprises a north pole when the coil is energized.

* * * * *